United States Patent
Pal et al.

(10) Patent No.: US 10,880,316 B2
(45) Date of Patent: Dec. 29, 2020

(54) METHOD AND SYSTEM FOR DETERMINING INITIAL EXECUTION OF AN ATTACK

(71) Applicant: CHECKPOINT SOFTWARE TECHNOLOGIES LTD., Tel Aviv (IL)

(72) Inventors: Anandabrata Pal, Rehovot (IL); Tamara Leiderfarb, Modiin (IL); Lior Arzi, Givatayim (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 165 days.

(21) Appl. No.: 14/963,265

(22) Filed: Dec. 9, 2015

(65) Prior Publication Data

US 2017/0171224 A1  Jun. 15, 2017

(51) Int. Cl.
| | |
|---|---|
| *H04L 29/06* | (2006.01) |
| *G06F 9/448* | (2018.01) |
| *G06F 21/55* | (2013.01) |
| *G06F 21/56* | (2013.01) |
| *G06F 9/445* | (2018.01) |

(52) U.S. Cl.
CPC ........ *H04L 63/1416* (2013.01); *G06F 9/4484* (2018.02); *G06F 21/552* (2013.01); *G06F 9/445* (2013.01); *G06F 21/566* (2013.01); *H04L 63/1425* (2013.01)

(58) Field of Classification Search
CPC ........ G06F 17/30; G06F 9/4484; G06F 9/445; G06F 21/552; G06F 21/566; H04L 63/14; H04L 63/1416; H04L 63/1425
USPC .......................................................... 726/23
See application file for complete search history.

(56) References Cited

U.S. PATENT DOCUMENTS

| | | | |
|---|---|---|---|
| 7,870,610 B1 | 1/2011 | Mitchell | |
| 7,958,560 B1 | 6/2011 | Guruswamy | |
| 8,464,346 B2 | 6/2013 | Barai | |
| 8,474,043 B2 | 6/2013 | Sturges | |
| 8,547,974 B1 | 10/2013 | Guruswamy | |
| 8,601,587 B1 | 12/2013 | Powell | |
| 8,813,234 B1 | 8/2014 | Bowers | |
| 8,881,282 B1 | 11/2014 | Aziz | |
| 9,098,333 B1 | 8/2015 | Obrecht | |
| 9,124,622 B1* | 9/2015 | Falkowitz | ........... H04L 63/1416 |

(Continued)

OTHER PUBLICATIONS

Shandilya et al., "Use of Attack Graphs in Secutiry Systems", Journal of Computer Networks and Communications, Oct. 2014.

(Continued)

*Primary Examiner* — Michael S McNally
(74) *Attorney, Agent, or Firm* — Mark M. Friedman

(57) ABSTRACT

Computerized methods and systems determine an initial execution of an attack on an endpoint. An indicator of the attack is obtained by analysis of a first process on the endpoint. A sequence of processes that includes the first process associates the initial execution of the attack with the first process. Each respective process in the sequence of processes is created or executed by at least one of the initial execution or a process in the sequence of processes. The initial execution is identified based on linking from the first process to the initial execution through a combination of executions and creations of the processes in the sequence of processes.

10 Claims, 4 Drawing Sheets

(56) References Cited

U.S. PATENT DOCUMENTS

| | | |
|---|---|---|
| 9,330,259 B2 * | 5/2016 | Klein .................. G06F 21/566 |
| 9,344,444 B2 | 5/2016 | Lippmann |
| 9,369,484 B1 | 6/2016 | Lacerte |
| 9,378,367 B2 * | 6/2016 | Pereira ................ G06F 21/554 |
| 9,531,736 B1 | 12/2016 | Torres |
| 9,537,884 B1 | 1/2017 | Raugas |
| 2002/0032717 A1 | 3/2002 | Malan |
| 2002/0157021 A1 | 10/2002 | Sorkin |
| 2004/0049693 A1 | 3/2004 | Douglas |
| 2004/0172557 A1 | 9/2004 | Nakae |
| 2005/0013841 A1 | 1/2005 | Phillips |
| 2005/0138413 A1 | 6/2005 | Lippmann |
| 2005/0257265 A1 | 11/2005 | Cook |
| 2006/0021034 A1 | 1/2006 | Cook |
| 2006/0021044 A1 | 1/2006 | Cook |
| 2006/0021045 A1 | 1/2006 | Cook |
| 2006/0021046 A1 | 1/2006 | Cook |
| 2006/0021047 A1 | 1/2006 | Cook |
| 2006/0021048 A1 | 1/2006 | Cook |
| 2006/0021049 A1 | 1/2006 | Cook |
| 2006/0021050 A1 | 1/2006 | Cook |
| 2006/0085858 A1 | 4/2006 | Noel |
| 2006/0173992 A1 | 8/2006 | Weber |
| 2006/0242406 A1 | 10/2006 | Barde |
| 2006/0248594 A1 | 11/2006 | Grigorovitch |
| 2006/0253906 A1 | 11/2006 | Rubin |
| 2007/0067843 A1 * | 3/2007 | Williamson ......... G06F 21/568 726/24 |
| 2007/0113281 A1 | 5/2007 | Leach |
| 2008/0002725 A1 | 1/2008 | Alicherry |
| 2008/0005782 A1 | 1/2008 | Aziz |
| 2008/0127292 A1 | 5/2008 | Cooper |
| 2008/0141371 A1 | 6/2008 | Bradicich |
| 2008/0222215 A1 | 9/2008 | Bai |
| 2009/0044024 A1 | 2/2009 | Oberheide |
| 2009/0271863 A1 | 10/2009 | Govindavajhala |
| 2010/0024036 A1 | 1/2010 | Morozov |
| 2010/0082513 A1 | 4/2010 | Liu |
| 2010/0293615 A1 | 11/2010 | Ye |
| 2010/0333002 A1 | 12/2010 | Karabey |
| 2011/0030045 A1 | 2/2011 | Beauregard |
| 2012/0233699 A1 | 9/2012 | Jajodia |
| 2013/0042294 A1 * | 2/2013 | Colvin .................. G06F 21/53 726/1 |
| 2013/0160128 A1 | 6/2013 | Dolan-Gavitt |
| 2013/0167236 A1 * | 6/2013 | Sick ...................... G06F 21/56 726/24 |
| 2013/0254494 A1 * | 9/2013 | Oxford .............. G06F 12/1466 711/145 |
| 2013/0318616 A1 | 11/2013 | Christodorescu |
| 2013/0339930 A1 | 12/2013 | Xu |
| 2013/0347111 A1 | 12/2013 | Karta |
| 2014/0237590 A1 * | 8/2014 | Shua ...................... G06F 21/53 726/22 |
| 2014/0289851 A1 * | 9/2014 | Klein .................. G06F 21/566 726/23 |
| 2015/0033346 A1 | 1/2015 | Hebert |
| 2015/0172302 A1 | 6/2015 | Conlon |
| 2015/0199512 A1 | 7/2015 | Kim |
| 2015/0264062 A1 * | 9/2015 | Hagiwara ............... G06F 21/56 726/24 |
| 2015/0269383 A1 | 9/2015 | Lang |
| 2015/0275718 A1 | 10/2015 | Jessberger |
| 2015/0278518 A1 * | 10/2015 | Pereira ................ G06F 21/554 726/23 |
| 2015/0371043 A1 * | 12/2015 | Bejerasco ............ H04L 63/145 726/22 |
| 2015/0373036 A1 | 12/2015 | Patne |
| 2016/0044049 A1 | 2/2016 | Xing |
| 2016/0072844 A1 | 3/2016 | Porras |
| 2016/0099963 A1 | 4/2016 | Mahaffey |
| 2016/0105454 A1 * | 4/2016 | Li ....................... H04L 63/1416 726/23 |
| 2016/0162690 A1 | 6/2016 | Reith |
| 2016/0172302 A1 | 6/2016 | Song |
| 2016/0173509 A1 * | 6/2016 | Ray .................... H04L 63/1425 726/23 |
| 2016/0188878 A1 * | 6/2016 | Kulkarni ................ G06F 21/56 726/23 |
| 2016/0239661 A1 | 8/2016 | Kawauchi |
| 2016/0285894 A1 | 9/2016 | Nelms |
| 2016/0359711 A1 | 12/2016 | Deen |
| 2016/0366167 A1 | 12/2016 | Yumer |
| 2016/0381043 A1 | 12/2016 | Yamada |
| 2017/0019421 A1 | 1/2017 | Hebert |
| 2017/0048266 A1 | 2/2017 | Hovor |
| 2017/0093910 A1 | 3/2017 | Gukal |
| 2017/0109189 A1 | 4/2017 | Swidowski |
| 2017/0126741 A1 | 5/2017 | Lang |
| 2017/0163666 A1 | 6/2017 | Venkatramani |
| 2018/0234310 A1 | 8/2018 | Ingalls |

OTHER PUBLICATIONS

Angelini et al., Percival: Proactive and Reactive Attack and Response Assessment of Cyber Incidents Using Visual Analytics, 2015, IEEE.

Buldas et al., "New Efficient Litility Upper Bounds for the Fully Adaptive Model of Attack Trees", Springer, 2013.

Kotenko et al., "A Cyber Attack Modeling and Impact Assessment Framework", 2013, NATO CCD COE Publiations.

* cited by examiner

METHOD AND SYSTEM FOR DETERMINING INITIAL EXECUTION OF AN ATTACK

CROSS-REFERENCE TO RELATED APPLICATIONS

This application is related to the following US Patent Applications and US Patents: 1) Method and System for Identifying Uncorrelated Suspicious Events During an Attack (U.S. patent application Ser. No. 15/292,169, filed on Oct. 13, 2016, now U.S. Pat. No. 10,462,160); 2) System and Method for Determining Summary Events During an Attack (U.S. patent application Ser. No. 15/372,423, filed on Dec. 8, 2016, now U.S. Pat. No. 10,291,634); 3) Method and System for Modeling All Operations and Executions of an Attack and Malicious Process Entry (U.S. patent application Ser. No. 14/963,267, filed on Dec. 12, 2015, now U.S. Pat. No. 10,291,634); and, 4) Method and System for Detecting and Remediating Polymorphic Attacks Across an Enterprise (U.S. patent application Ser. No. 15/373,482, filed on Dec. 9, 2016, now U.S. Pat. No. 10,193,906), all of the disclosures of the aforementioned patent applications and patents being commonly owned and being incorporated by reference in their entirety herein.

TECHNICAL FIELD

The present invention relates to methods and systems for detecting potential malware.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Software, such as, for example, anti-virus, anti-spyware, anti-malware and firewalls, are depended upon by computer users for protecting against malware and other malicious attacks. These types of protective software also help to identify malware attacks and take protective actions in response to identification of a malware attack.

SUMMARY OF THE INVENTION

The present invention is directed to computerized methods and systems, which determine an initial execution of an attack initiated on an endpoint client.

Embodiments of the present invention are directed to a method determining an initial execution of an attack on an endpoint.

The method finds the first malicious execution that is part of the attack, separating it from any benign activity that may have been used to bring the malicious artifacts to the machine, and used to execute the attack in the infected machine.

When a malicious attack is detected on a system, it usually contains some specific artifact that triggered someone's (a person, a computer system or some software located inside or outside the machine) attention or suspicion. This can represent any stage of the attack.

Given the trigger and its artifact, this method will follow back in time the artifact's execution, and the executors/creators that executed/created them, until the first execution is reached, so there are no other tracks of the attack from previous in time.

This will end-up as a sequence of processes executed/created by other processes, until the initial execution is identified based on linking from the first discovered artifact through a combination of executions and creations of the processes in the sequence of processes.

Optionally, the endpoint is part of a network.

Optionally, the initial execution is at least one of a suspicious process or a malicious process.

Optionally, the analyzing of the first process is indicative of an activity selected from the group consisting of: accessing of a malicious web site, initiating a malicious communication with a network device, opening a malicious file, and creating a malicious data object.

Optionally, the combination of executions and creations of the processes in the sequence of processes is based in part on at least one characteristic of each respective process in the sequence of processes.

Optionally, at least one characteristic of each respective process is based on a reputation of the respective process being provided by a reputation service.

Optionally, for each respective process in the sequence of processes, an executing process of the respective process is determined if the respective process is classified as a known process.

Optionally, for each respective process in the sequence of processes, a creating process of the respective process is determined if the respective process is classified as a process instance of a payload application.

Optionally, the determination of the creating process comprises: determining at least one file opened by the payload application.

Optionally, the at least one file is a malicious file.

Optionally, for each respective process in the sequence of processes, a creating process of the respective process is determined if the respective process is classified as an unknown process or a malicious process.

Optionally, the determination of the creating process comprises: determining a file that caused the execution of the respective process.

Optionally, the determination of the creating process comprises: identifying the creating process as the process in the sequence of processes that created the file.

Optionally, at least one process in the sequence of processes is configured to persist after termination of a creating or executing process of the at least one process.

Embodiments of the invention are directed to a computer system for determining an initial execution of an attack on an endpoint. The computer system comprises: a storage medium for storing computer components; and a computerized processor for executing the computer components. The computer components comprise: a computer module configured for: obtaining an indicator of the attack by analyzing a first process on the endpoint, the initial execution being associated with the first process by a sequence of processes that includes the first process, each respective process in the sequence of processes being executed or created by at least one of the initial execution or a process in the sequence of processes; and identifying the initial execution based on linking from the first process to the initial execution through a combination of executions and creations of the processes in the sequence of processes.

Optionally, the identifying the initial execution is based in part on at least one characteristic of each respective process in the sequence of processes.

Optionally, the computer module includes a reputation module, and the at least one characteristic of each respective process is based on a reputation of the respective process provided by the reputation module.

Optionally, at least one process in the sequence of processes is configured to persist after termination of a process that created or executed the at least one process.

Optionally, the computer system comprises: a database for storing endpoint activity.

Optionally, the computer module includes an agent.

Embodiments of the invention are directed to a computer usable non-transitory storage medium having a computer program embodied thereon for causing a suitable programmed system to determine an initial execution of an attack on an endpoint, by performing the following steps when such program is executed on the system.

The steps comprise: obtaining an artifact of the attack by analyzing a process execution associated to it on the endpoint, and the chain of the processes that executed it each respective process in the sequence of processes being executed or created by at least one of the initial execution or a process in the sequence of processes; and identifying the initial execution based on linking from the first process to the initial execution through a combination of executions and creations of the processes in the sequence of processes.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "process" refers to an instance of a computer program that is being executed (e.g. executable file). While a computer program is a passive collection of instructions; a process is the actual execution of those instructions. Each process provides the resources necessary to execute the program file. A process includes, for example, an image of the executable machine code associated with a program, memory (typically some region of virtual memory); which includes the executable code, process-specific data (input and output), a call stack (to keep track of active subroutines and/or other events), and a heap to hold intermediate computation data generated during run time, operating system descriptors of resources that are allocated to the process, such as handles (Windows), Security attributes, such as the process owner and the process' set of permissions (allowable operations), a unique identifier etc. A non-exhaustive list of examples of processes includes:

processes that are instances/executions of compression applications, such as, for example, zip applications, rar applications and the like;

processes that are instances/executions of network applications, such as, for example, email clients, web browsers (e.g. chrome, firefox, etc.), and FTP (file transfer protocol) clients;

processes that are instances/executions of payload applications, such as, for example, Microsoft® Office applications and Adobe® PDF Reader®;

processes that are instances/executions of executables written and maintained by the creators of the operating system (OS) (i.e., Microsoft) and packaged on the computer as part of the operating system, such as, for example, services.exe and explorer.exe.

A "payload application" refers to an application that is generally considered to be benign but that can be used for malicious intent if used to execute a malicious file. A non-exhaustive list of examples of payload applications includes:

Microsoft® Office applications (e.g. Microsoft® Word, Microsoft® Excel, Microsoft® Project, etc.);

Adobe® PDF Reader®.

A "compression/installer (install helper) application" refers to an application that is primarily purposed to reduce the size of a file and combine multiple files into a single file in order to facilitate easier storage, transmission and distribution. Compression applications are generally considered to be benign but can be used for malicious intent if used to extract a malicious file. A non-exhaustive list of examples of compression applications includes:

Zip applications;

RAR applications;

7z applications;

MISEXEC.

A "network application" refers to an application that is primarily purposed to initiate and maintain a connection between the computer running the network application and other computers on a network or over the Internet. A non-exhaustive list of examples of network applications includes:

email clients;

web browsers (e.g. chrome, firefox, etc.);

FTP clients.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
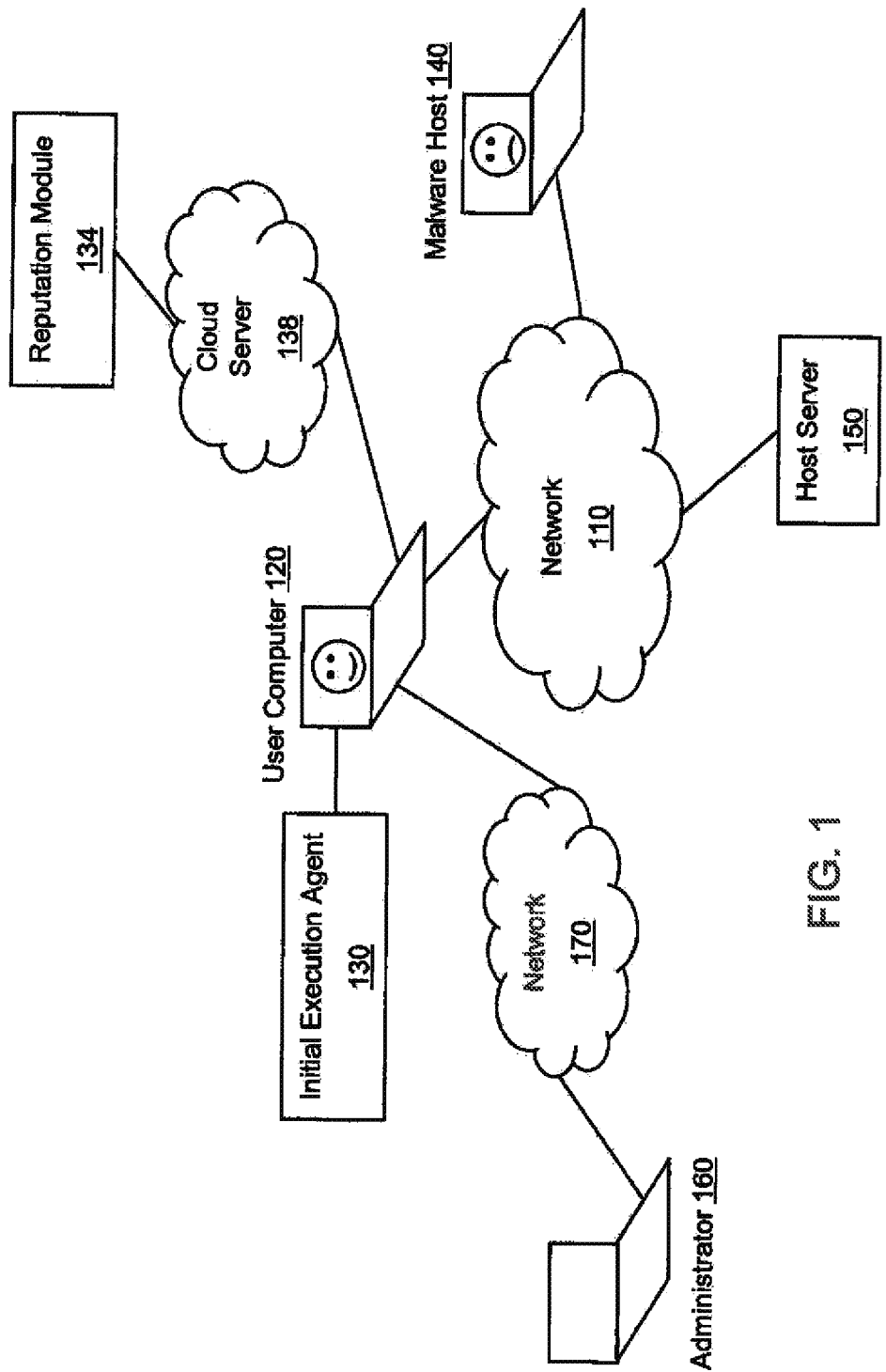
FIG. 1 is a diagram illustrating a system environment in which an embodiment of the invention is deployed.

The present invention is directed to computerized methods and systems, which determine an initial execution of an attack, such as, for example, a malicious attack, initiated on an endpoint client. The initial execution of the attack may be, for example, the result of the execution of a malicious or suspicious process.

An agent installed on an endpoint client monitors activity on the endpoint client computer, machine, or the like. When an attack is detected by suspicious or malicious activity of a process, either by the agent or a similar agent, the agent links (i.e., traces) the process tied to the suspicious or malicious activity to the initial execution of the attack through a combination of process creations and process executions in a sequence of processes. The sequence of processes associates the initial execution with the attack detection and includes the process tied to the suspicious or malicious activity that caused the detection of the attack. As a result, the agent is able to identify the initial execution (i.e., process execution) of the attack initiated on the endpoint client computer.

In the context of this document, the term "data object" generally refers to files and registry keys.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Refer now to FIG. 1, an illustrative example environment in which embodiments of the present disclosure are performed over a network 110. The network 110 may be formed of one or more networks, including for example, the Internet, cellular networks, wide area, public, and local networks. The embodiments include a system 120' (FIG. 2), including, for example, an agent 130, on an endpoint client, for example, a user computer 120 (linked to the network 110). The agent 130 determines the initial execution of an attack (i.e., malware attack) on the user computer 120. In a non-limiting example, a malware host 140, also linked to the network 110, creates a malicious file that when executed calls a process that may be a malicious process or a benign process. The malicious file is made available to the host server 150 by the malware host 140. The host server 150 is linked to the network 110 and represents numerous servers hosting, for example, web sites, accessible through web servers (not shown). The malicious file enters the user computer 120 via the access of the host server 150 by the user computer 120.

The agent 130 includes software, software routines, code, code segments and the like, embodied, for example, in computer components, modules and the like, that are installed on machines, such as the user computer 120. For example, the agent 130 performs an action when a specified event occurs, as will be further detailed below. The agent 130 may be instructed to perform such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
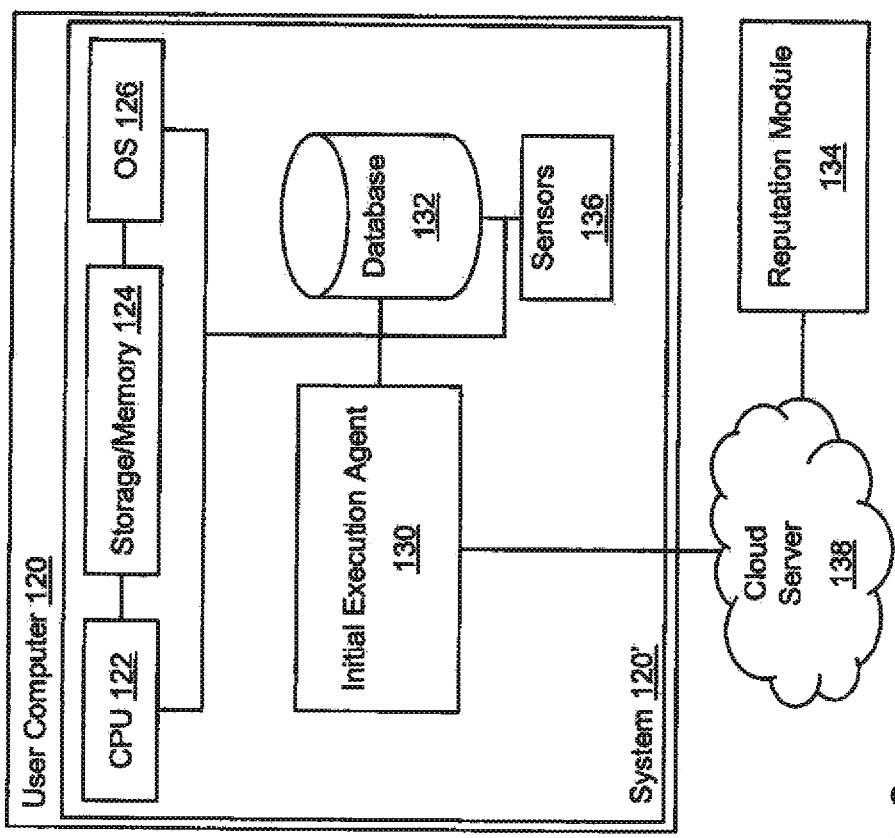
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as "the system" in the description of FIGS. 3 and 4 below. All components of the user computer 120 and/or the system 120' are connected or linked to each other (electronically and/or data), either directly or indirectly.

Initially, the user computer 120 includes a central processing unit (CPU) 122, a storage/memory 124, and an operating system (OS) 126. The processors of the CPU 122 and the storage/memory 124, although shown as a single component for representative purposes, may be multiple components.

Figure 4:
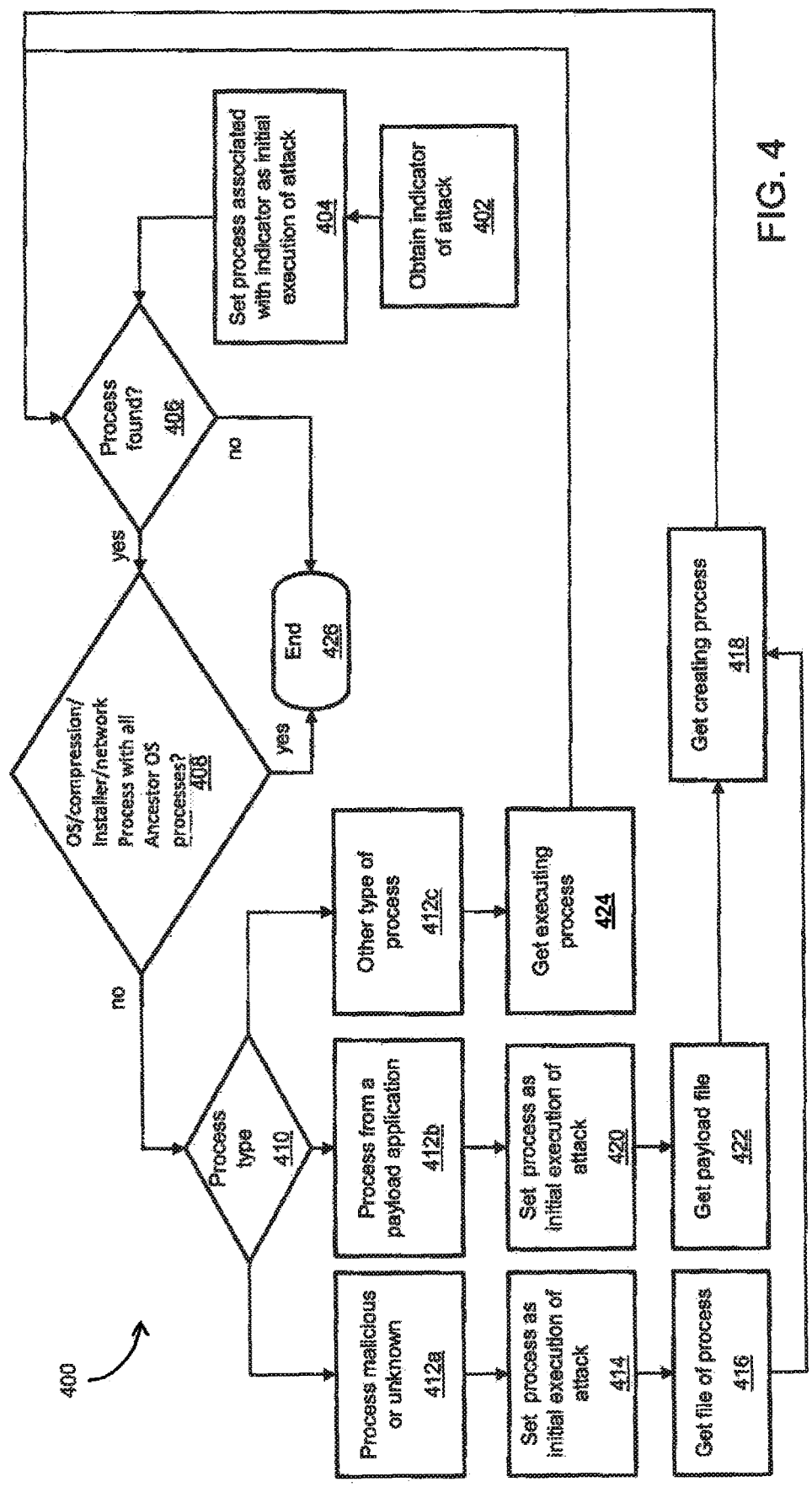
FIG. 4 is a flow diagram illustrating a process to identify an initial execution of an attack initiated on an endpoint according to an embodiment of the invention.

The CPU 122 is formed of one or more processors, including microprocessors, for performing the user computer 120 functions, including executing the functionalities and operations of the agent 130, as detailed herein, the OS 126, and including the processes shown and described in the flow diagram of FIG. 4. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIG. 4, detailed herein.

The OS 126 includes any of the conventional computer operating systems, such as those available from Microsoft of Redmond Wash., commercially available as Windows® OS, such as Windows® XP, Windows® 7, MAC OS from Apple of Cupertino, Calif., or Linux.

Activity that occurs on the user computer 120 is sensed by the sensor or sensors 136 on the user computer 120. In particular, the sensors 136 are configured to sense changes that occur on the user computer 120. Examples of activity sensed by the sensors 136 includes, but is not limited to file accesses, network accesses, application accesses, registry accesses, file creations, file modifications, process calls and process creations. The activity sensed by the sensors 136 is written to (i.e., stored in) an activity log which can be maintained in a structured format, such as, for example, the database 132, accessible by the agent 130.

The database 132 may be installed with the system 120', or may be provided on a remote server, such as, for example, a cloud server 138 (and remain part of the system 120'). Accordingly, the activity log includes a listing of the executions and creations of the processes and data objects on the user computer 120. The activity log may be programmed or otherwise configured to retain the above mentioned information for blocks of time, for example, weeks, months and years. The activity log may also be programmed or otherwise configured to overwrite information pertaining to older activity with information pertaining to recent activity. As such, the activity log retains information for a sliding window of time.

The agent 130 makes determinations regarding files executed on the user computer 120 based on the reputations of the executing processes, by extension, or the reputations of files that when accessed or opened result in the execution of processes. The reputations of the above mentioned processes and files are provided to the agent 130 by a reputation service in the form of a reputation module 134. The reputation module 134 is typically provided on a remote server, such as, for example, a cloud server 138, which is accessible by the agent 130. Alternatively, the reputation module 134 may be installed on the user computer 120 or as part of an anti-malware software suite such as, for example, Microsoft Security Essentials, Norton anti-virus, and McAfee anti-virus. Note that the reputation module 134 may also be installed as part of the agent 130. Accordingly, the agent 130 may be configured to classify (not shown) processes and files into the three above mentioned categories.

The reputation module 134 analyzes the files accessed and the processes executed on the user computer 120. As a result, the reputation module 134 is able to classify all processes executed on the user computer 120 into three categories: malicious processes, unknown processes, and non-malicious processes (i.e., good processes). As an example, processes that are instances of payload applications are typically classified as non-malicious. The process called by the execution of the Windows® OS executable file sdbinst.exe is also an example of a non-malicious process.

The reputation module 134, regardless of its location, may also be part of the system 120'.

Figure 3:
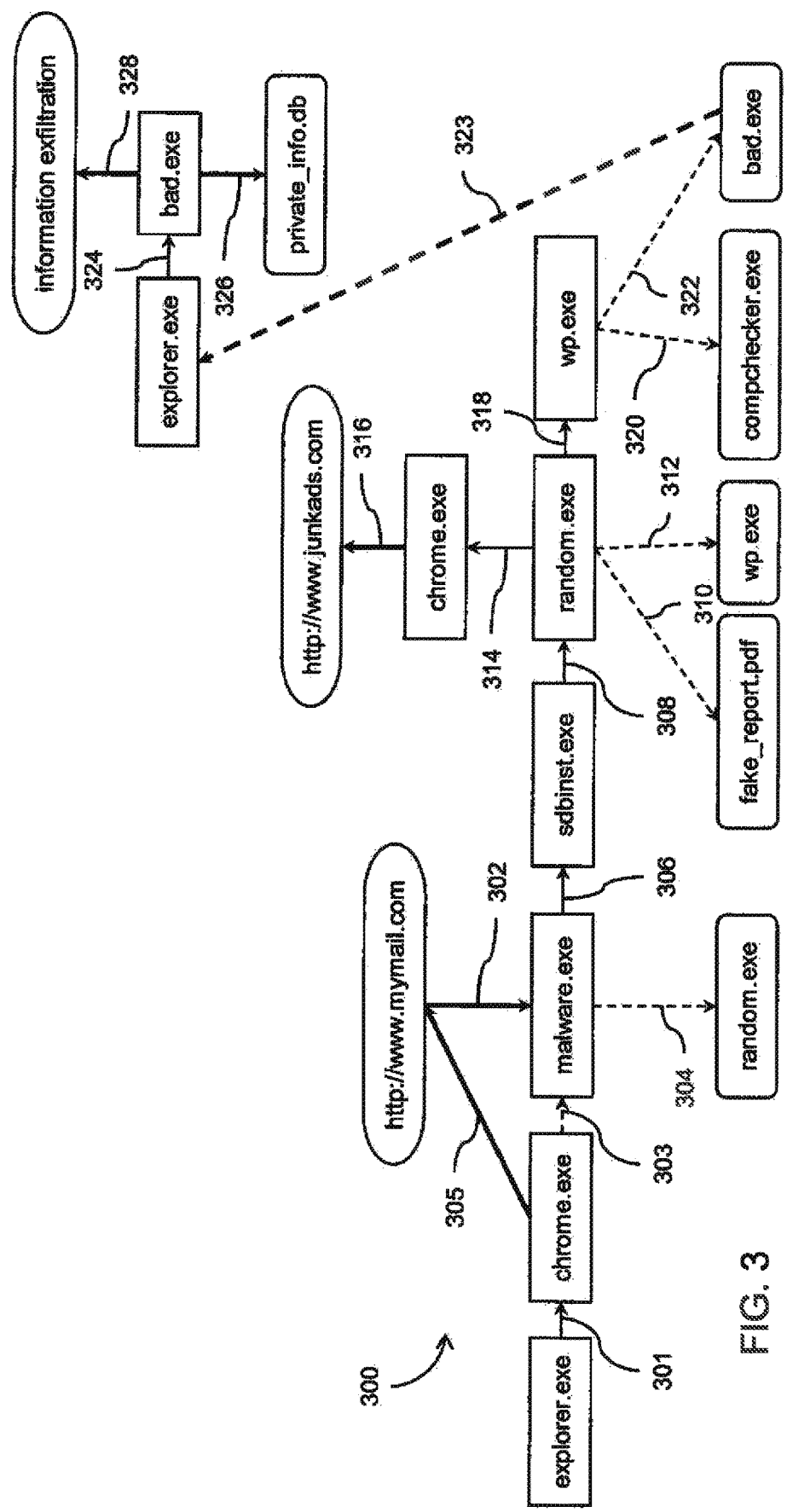
FIG. 3 is a diagram of an example of an attack.

To better understand the operation of the components of the system 120', including the agent 130 and all instructions for executing the processes of FIG. 4, an example of an attack 300 as carried out on the user computer 120 is first illustrated in FIG. 3. In the example, the OS 126 of the user computer 120 is a Windows® OS. The attack 300 illustrated in FIG. 3 depicts paths that include creations of processes and data objects (exemplified by thin dashed arrows), execution events in which a process executes (i.e., calls) another process (results of which are exemplified by thin solid arrows), and accesses, such as, for example, downloads, uploads, data transfers, file transfers, and process accesses (exemplified by thick solid arrows). Additional paths in alternate example of attacks may be depicted to show network operations, file modifications, registry entries, injections, mutexes, pipes, and application arguments.

In the example attack 300 illustrated in FIG. 3, a malicious process instance of malware.exe, enters the user computer as a file malware.exe (not shown) via a download 302 from a web site, for example, www.mymail.com, accessed 305 through a web browser via the process chrome.exe. As a result, the process chrome.exe causes the creation 303 of the malware.exe executable file (and the execution of the process malware.exe). It is noted that the process chrome.exe is executed 301 by the Windows® OS process explorer.exe (which although not shown, is executed by a Windows® OS process such as, for example, userinit.exe). Although not shown in the drawings, the malicious process may be initially executed by a file (i.e., malicious file) that was extracted from a compressed file, such as, for example, a zip file, a rar file, or the like, downloaded from the web site.

The execution of the process malware.exe causes the creation 304 of the random.exe executable file. The execution of the process malware.exe also executes 306 a Windows® OS process sdbinst.exe.

The execution of the process sdbinst.exe causes the execution 308 of the created process random.exe.

The execution of the process random.exe causes the execution 314 of the process chrome.exe in order to access 316 the web site www.junkads.com. The execution of the process random.exe also causes the creation 310 of the file fake_report.pdf. The execution of the process random.exe also causes the creation 312 of the wp.exe executable file. The execution of the process random.exe also causes the execution 318 of the process wp.exe. The execution of the process wp.exe causes the creation 320 of the executable file compchecker.exe, and the creation 322 of the executable file bad.exe. The creation of the file bad.exe by the process wp.exe additionally places the file bad.exe in the OS startup folder, for example, the Windows® OS startup folder. As a result, upon rebooting (i.e., reloading of the OS 126 into memory) and/or restarting of the user computer 120, the process bad.exe is executed 324 by a Windows® OS process, such as, for example, the process explorer.exe. The reboot is depicted in FIG. 3 by a thick dashed arrow 323 indicative of a boot line.

The execution of the process bad.exe causes the access 326 of private information on the user computer 120, namely private_info.db. The execution of the process bad.exe also causes exfiltration, via transfer 328, of information accessed on the user computer 120 to external parties.

The processes executed and created during the attack illustrated in FIG. 3 span across multiple boots of the user computer 120, as depicted by the reboot 323. Specifically, the activities described by the identifiers 301-322 are executed and/or created on the user computer 120 subsequent to a first boot of the user computer 120, whereas the activities described by the identifiers 324-328 are executed and/or occur on the user computer 120 subsequent to a second boot of the user computer 120 that occurs after the first boot. As a result, the process bad.exe persists even after termination of the process wp.exe.

Accordingly, the process malware.exe, and the process bad.exe, are linked by a sequence of processes, the creations and executions (i.e., calling) of which are retained in the activity log. Each process in the sequence is successively linked to at least one other process in the sequence, and is responsible for creating or executing at least one other process in the sequence of processes. Moreover, each process stemming from the initial execution of the attack is linked to the process malware.exe by a sequence of processes. The activity log provides the agent 130 (and the system 120') with the necessary information for ascertaining the above mentioned process linkages.

In the context of this document, the term "ancestor process" or "ancestor processes" of a specific process generally refers to the process or processes that were previously successively called or created in order to execute the specific process. For example with respect to the attack 300 of FIG. 3, the ancestor processes of the process wp.exe are the processes instances of the following executable files: explorer.exe, chrome.exe, malware.exe, sdbinst.exe, and random.exe. Accordingly, the ancestor process or processes of a specific process identified as part of an attack are used to provide the above mentioned linkage between the initial execution of the attack and the specific process.

Attention is now directed to FIG. 4 which shows a flow diagram detailing a computer-implemented process 400 in accordance with embodiments of the disclosed subject matter. This computer-implemented process includes an algorithm for determining the initial execution of an attack (i.e., malware attack) on the user computer 120. Reference is also made to the elements shown in FIGS. 1-3. The process and sub-processes of FIG. 4 are computerized processes performed by the system 120' including, for example, the CPU 122 and associated components, such as the agent 130, at the user computer 120, which as shown represents a client or client computer. The aforementioned processes and sub-processes are for example, performed automatically, but can be, for example, performed manually, and are performed, for example, in real time.

As will be discussed, the process 400 involves determinations made based on characteristics of processes associated with (i.e., executions/instances of) executable files, as well as characteristics of data objects. The process 400 is iterative in nature, and entails such determinations made for each respective process associated with a respective executable file or data object. For clarity, the process in question for which such a determination is made at stages of each iterative step is referred to hereinafter as the "instant process".

The process 400 begins at block 402. In order for the system 120' to determine the initial execution (i.e., process execution) of the attack, the system 120' must first ascertain the presence of the attack on the user computer 120. Therefore, in block 402, the system 120' receives an indicator of the presence of an attack. The indicator provides an indication of an activity of a process on the user computer 120 that is considered to be malicious or suspicious. Methods and techniques for providing indications of such activity by analysis of processes are well known in the art. The indication of the malicious or suspicious activity of a process is also referred to interchangeably herein as a trigger event.

Note that the agent 130 may be configured to perform processes (not shown) for detecting the presence of the attack via identification of a trigger event. Alternatively, the system 120' may be configured to receive the above mentioned indicator from another agent or module operating on the system 120', such as for example, an event identification module (not shown) that may be part of an anti-malware software suite such as, for example, Microsoft Security Essentials, Norton anti-virus, and McAfee anti-virus.

The malicious or suspicious activity that provides the indication in block 402 may be the result of many possible actions executed on the user computer 120. A non-exhaustive list of examples of such activities includes, but is not limited to: accessing of a malicious web site or Internet address (via a URL, IP address or the like), initiating a malicious communication with a network device on the network, opening a malicious file by a process, creating a malicious data object, and creating or modifying or accessing a data object with an entity indicative of an attack.

The instant process is the process that is associated with the activity that triggered the indication of the attack, and is set as the initial execution of the attack in block 404. The process 400 moves to block 406 where the instant process is analyzed by the system against the activity log. In block 406, if a record of the instant process is not found in the activity log (i.e., the instant process does not exist to the system), the process 400 is terminated in block 426, in which the instant process is determined to be the initial execution of the attack. If a record of the instant process is found in the activity log (i.e., the instant process exists to the system), the process 400 moves to block 408.

In block 408, the instant process is analyzed by the system to determine if the instant process is an OS/compression/installer (install helper)/network process in which all ancestor processes are OS processes, a a compression application process in which all ancestor processes are OS processes, or a process a network application process in which all ancestor processes are OS processes. If the instant process is determined to be such a process with all ancestor processes being OS processes, the process 400 is terminated in block 426, in which the instant process is determined to be the initial execution of the attack.

Consider a non-limiting example of an OS process in which all ancestor processes are OS processes in the context of the opening of a non-malicious file on a computer running a Windows® OS. As should be understood, such a file is typically opened by double clicking (via a mouse) on an icon of the file in a Windows explorer window. As a result of the opening of the file, the Windows Session Manager Subsystem (smss.exe) process is called, which in turn calls Windows Login subsystem (winlogon.exe) process, which in turn calls the process userinit.exe, which in turn calls the process explorer.exe in order to open the requested file. As should be understood, if the file is a compressed file (e.g. zip, rar, etc.), the above chain of process calls would also include the execution of a process for extracting the compressed file, followed by the process calls for opening the extracted file as described above.

In block 408, if the instant process is neither an OS process in which all ancestor processes are OS processes, a process a compression application process in which all ancestor processes are OS processes, nor a network application process in which all ancestor processes are OS processes, the process 400 moves to block 410 where the instant process type is determined by the system, and can be one of three type categories, a malicious process or a process unknown to the system (block 412a), a payload application process (block 412b), or other non-malicious processes or processes known to the system that are not payload application processes (block 412c). The determination of the instant process type is made based on the reputation of the instant process as classified by the reputation module 134.

A non-exhaustive list of processes categorized as other types of processes (block 412c) includes, but is not limited to: scheduler processes, accessory processes (e.g. desktop clock, etc.), or any other non-payload application associated non-malicious process or process known to the system categorized as such by the reputation module 134.

If the instant process is a malicious or unknown process (block 412a), the process 400 moves to block 414, where the instant process is set as the initial execution of the attack. From block 414, the process 400 moves to block 416 and subsequently to block 418, to determine the process that created the instant process (i.e., malicious or unknown process). This is equivalent to determining a previous process in the sequence of processes linking the initial execution to the detection of the attack. In order make such a determination, the name of the file (i.e., executable file) that caused the execution of the instant process is retrieved from the activity log in block 416, and the process that created the executable file of the instant process is retrieved from the activity log in block 418. The process 400 then moves to block 406.

Returning to block 412b, the instant process is determined by the system to be a payload application process. From block 412b, the process 400 moves to block 420 where the instant process is set as the initial execution of the attack. From block 420, the process 400 moves to block 422 and subsequently to block 418 to determine the process that created the instant process. Specifically, in block 422 the payload file name of the payload file that is associated with (i.e., opened by) the payload application is retrieved from the activity log. The operation of block 422 is equivalent to obtaining the payload file associated with the current instance of the payload application process (for example as the result of the process winword.exe opening a malicious file). From block 422 the process 400 moves to block 418 in order to identify the process that created the payload file associated with the payload application. The process that created the payload file associated with the payload application is the instant process and the process 400 moves to block 406.

In practice, the execution of the functionality of block 422 may be carried out in several ways. For example, a heuristic approach that relies on time stamp information of the files and processes may be used to retrieve the correct payload file. Alternatively, pattern recognition techniques may be used to retrieve the correct payload file by identifying potentially malicious content in payload files (for example macros in Microsoft® Office files).

It is noted herein that the successive execution of blocks 412b, 420, 422 and 418 allows for the process 400 to identify malicious files that cause non-malicious processes to perform malicious actions when accessed. For example, as previously discussed, the processes that are instances of the Microsoft® Word payload application are non-malicious when used to open non-malicious files. However, opening a malicious Microsoft® Word file with the Microsoft® Word payload application causes the non-malicious processes to perform malicious actions, such as, for example, the indirect creation or execution of a malicious process. As a result of block 422, such a malicious file can be identified, and the process that created the malicious file can also be identified.

Returning to block 412c, the instant process is determined by the system to be a known or non-malicious process that is not a payload application process. From block 412c, the process 400 moves to block 424 where the process that executed the instant process is determined. The process that executed the instance process may also be referred to interchangeably as the parent process of the instant process. This is equivalent to determining a previous process in the sequence of processes linking the initial execution to the detection of the attack. In order to make such a determination, the process that executed the executable file of the instant process is retrieved from the activity log. The process that executed the executable file of the instant process is the instant process and the process 400 moves to block 406.

In order to better understand the process 400 of FIG. 4, consider a non-limiting example of an attack in which the exfiltration, via transfer 328, of information accessed on the user computer 120 (caused by the process bad.exe) serves as the trigger event (i.e., suspicious or malicious activity) indicating an attack on the user computer 120. As previously discussed, the attack is initiated by the execution of the process malware.exe upon download from a web site via the chrome browser (i.e., chrome.exe). Proper functionality of the sensors 136 and the database 132 is assumed in this example, ensuring that each instant process is found in the activity log.

In block 402, the system receives an indication of the suspicious or malicious activity due to the exfiltration 328 caused by the process bad.exe. As a result, the instant process (i.e., the process bad.exe) is set as the initial execution of the attack (block 404), and is analyzed against the activity log in block 406. Since the process bad.exe is found in the activity log, the process 400 moves to block 408.

The process bad.exe is neither an OS/compression/installer (install helper)/network process, a compression application process, nor a network application process. Therefore the process 400 moves from block 408 to block 410. The process bad.exe is unknown to the system based on the classification of the reputation module 134 (or alternatively classified as malicious). Accordingly, the process 400 moves from block 410 to block 412a. The process bad.exe is set as the initial execution of the attack in block 414. Note that although the process explorer.exe executed the process bad.exe after re-boot, since the process bad.exe is classified as unknown to the system (or alternatively classified as malicious) by the reputation module 134, the system moves to identify the process that created the file bad.exe. This allows the system to link the process bad.exe to the previous boot of the user computer 120.

The process 400 then moves to blocks 416 and 418. As a result of the execution of blocks 416 and 418 the process wp.exe is identified as the process that created the file bad.exe. The process wp.exe is analyzed against the activity log in block 406. Since the process wp.exe is found in the activity log, the process 400 moves to block 408.

The process wp.exe is neither an OS process, a compression application process, nor a network application process. Therefore the process 400 moves from block 408 to block 410. The process wp.exe is unknown to the system based on the classification of the reputation module 134 (or alternatively classified as malicious). Accordingly, the process 400 moves from block 410 to block 412a. The process wp.exe is set as the initial execution of the attack in block 414.

The process 400 again moves to blocks 416 and 418. As the result of the execution of blocks 416 and 418, the process random.exe is identified as the process that created the file wp.exe. The process random.exe is analyzed against the activity log in block 406. Since the process random.exe is found in the activity log, the process 400 moves to block 408.

The process random.exe is neither an OS process, a compression application process, nor a network application process. Therefore the process 400 moves from block 408 to block 410. The process random.exe is unknown to the system based on the classification of the reputation module 134 (or alternatively classified as malicious). Accordingly, the process 400 moves from block 410 to block 412a. The process random.exe is set as the initial execution of the attack in block 414.

The process 400 again moves to blocks 416 and 418. As the result of the execution of blocks 416 and 418, the process malware.exe is identified as the process that created the file random.exe. The process malware.exe is analyzed against the activity log in block 406. Since the process malware.exe is found in the activity log, the process 400 moves to block 408.

The process malware.exe is neither an OS process, a compression application process, nor a network application process. Therefore the process 400 moves from block 408 to block 410. The process malware.exe is unknown to the system based on the classification of the reputation module 134 (or alternatively classified as malicious). Accordingly, the process malware.exe is set as the initial execution of the attack in block 414.

The process 400 again moves to blocks 416 and 418. As the result of the execution of blocks 416 and 418, the process chrome.exe is identified as the process that created the file malware.exe. The process chrome.exe is analyzed against the activity log in block 406. Since the process chrome.exe is found in the activity log, the process 400 moves to block 408.

The process chrome.exe is a network application. Furthermore, the ancestor processes of the process chrome.exe are the processes explorer.exe and its ancestors which although not shown, is a Windows® OS process such as, for example, userinit.exe. Accordingly, since all ancestor processes are OS processes, the process 400 moves to block 426 and terminates. As a result, the process malware.exe is determined to be the initial execution of the attack.

In order to further understand the operation of the components of the system 120', including the agent 130 and all instructions for executing the processes of FIG. 4, the following additional three examples of process executions and creations are presented, along with the identification of the initial execution (i.e., process execution) of the attack corresponding to each example.

Consider as a first example the scenario in which the process winlogon.exe executes explorer.exe, which in turn causes the process explorer.exe to execute chrome.exe, which in turn causes the process chrome.exe to create the unknown file abc.exe. In a subsequent boot, the process winlogon.exe executes explorer.exe, which in turn causes the process explorer.exe to execute abc.exe, which in turn causes the process abc.exe to execute cmd.exe, which in turn causes the process cmd.exe to execute explorer.exe, which causes the activity that serves as the trigger event for the process 400.

The flow of the process 400 for the first example is as follows, with the outputs of blocks, when applicable, being shown in parenthesis:

Block 402→Block 404 (process explorer.exe set as initial execution)→Block 406 (yes)→Block 408 (no)→Block 410→Block 412c→Block 424 (process cmd.exe)→Block 406 (yes)→Block 408 (no)→Block 410→Block 412c→Block 424 (process abc.exe)→Block 406 (yes)→ Block 408 (no)→Block 410→Block 412a (process abc.exe is unknown or malicious)→Block 414 (process abc.exe set as initial execution)→Block 416 (retrieve executable filename abc.exe)→Block 418 (process chrome.exe created abc.exe)→Block 406 (yes)→Block 408 (yes)→Block 426 (end).

Based on the execution steps of the process 400 as previously described, the process abc.exe is determined to be the initial execution. Note that when the process abc.exe is set as the initial execution, the process 400 executes block 418 in order to determine that the process chrome.exe created the file abc.exe. Since the process chrome.exe is a network application process and all ancestor processes of the process chrome.exe are OS processes, upon subsequent execution of block 408, the process 400 terminates at block 426. As a result, the process abc.exe is determined to be the initial execution of the attack.

In a second example, consider the scenario in which a user of the user computer 120 uses the Chrome web browser to access a web server that is known to contain a malware software suite, that may be installed on the user computer 120 to execute malicious content. As such, consider the execution flow of such a scenario in which the process winlogon.exe executes explorer.exe, which in turn causes the process explorer.exe to execute chrome.exe. In such a scenario, the process chrome.exe causes the activity that serves as the trigger event and also is determined to be the initial execution (block 404) of the attack, since the process chrome.exe is a network application and all ancestor processes of the process chrome.exe are OS processes (block 408).

In a third example, consider the scenario in which a user of the user computer 120 uses the Chrome web browser to access a web server to download and open a Microsoft® Word file. As such, consider the execution flow of such a scenario in which the process winlogon.exe executes explorer.exe, which in turn causes the process explorer.exe to execute chrome.exe, which in turn causes the process chrome.exe to execute winword.exe, which in turn causes the process winword.exe to create the file abc.exe and execute the process abc.exe. In such a scenario, the process abc.exe causes the activity that serves as the trigger event.

The flow of the process 400 for the third example is as follows, with the outputs of blocks, when applicable, being shown in parenthesis:

Block 402→Block 404 (process abc.exe set as initial execution)→Block 406 (yes)→Block 408 (no)→Block 410→Block 412a (process abc.exe is unknown or malicious)→Block 414 (process abc.exe set as initial execution)→Block 416 (retrieve executable filename abc.exe)→Block 418 (process winword.exe created abc.exe)→Block 406 (yes)→Block 408 (no)→Block 410→Block 412b (process winword.exe is a payload application)→Block 420 (process winword.exe set as initial execution)→Block 422 (Microsoft® Word file opened by winword.exe is retrieved from the activity log)→Block 418 (process chrome.exe created Microsoft® Word file)→Block 406 (yes)→Block 408 (yes)→Block 426 (end).

Based on the execution steps of the process 400 as previously described, the process winword.exe is determined to be the initial execution of the attack. Note that when the process abc.exe is set as the initial execution, the process 400 executes block 418 in order to determine that a process winword.exe created abc.exe. Subsequently, the process 400 executes block 420, in which the process winword.exe is set as the initial execution, subsequently blocks 422 and 418, in which the process that created the Microsoft® Word file opened by winword.exe (blocks 422 and 418) is determined to be the process chrome.exe. Since the process chrome.exe is a network application and all ancestor processes of the process chrome.exe are OS processes, upon subsequent execution of block 408, the process 400 terminates at block 426. As a result, the process winword.exe is determined to be the initial execution of the attack.

As a result of linking the trigger event process to the initial execution of the attack through the combination of process executions and file creations as described above, the agent 130 is able to quickly initiate (by signaling) the taking of protective actions by the user computer 120. Such protective actions may also include remediation actions such as: 1) displaying a message, warning window, or the like, on the user computer 120; 2) suspending the administrative account of the user, for example, by locking the user computer 120; 3) alerting or notifying the system administrator 160 about this security incident; and 4) quarantining the user computer 120, e.g., blocking the user computer 120 from accessing the network 110, or otherwise disconnecting the user computer 120 from the network 110, or disabling the user computer 120.

Additional protective actions taken by the user computer 120 as initiated by the agent 130 may also include remediation actions and damage assessment of each data object and process affected by the initial execution of the attack. In order to identify the data objects and processes affected by the initial execution, the agent 130, or a similar entity that has access to information provided by the agent 130, may be programmed to construct a tree based model of the attack. For example, an attack modeling module (not shown), may be included as part of the system 120' for generating such a model. Such a model preferably includes the process identified as the initial execution of the attack and all processes successively linked to the initial execution as well as all data objects accessed, modified, or created by processes called by the initial execution, or accessed, modified, or created by the initial execution itself. The example of the attack 300 in FIG. 3 serves as an example model of an attack. The methodology of the construction of such a tree based model is disclosed in the applicants' commonly owned US Patent Application, entitled "Method and System for Modeling All Operations and Executions of an Attack and Malicious Process Entry" (U.S. patent application Ser. No. 14/963,267, filed on Dec. 12, 2015, now U.S. Pat. No. 10,291,634), filed on the same day as this application, the disclosure of which is incorporated by reference in its entirety herein.

It is noted herein that as a byproduct of the linkage between process executions and creations, the process 400 can identify the initial execution of the attack across multiple boots (i.e., loads of the OS 126 into memory) and restarts of the user computer 120. As a result, the process 400 allows the linking to the initial execution of the attack even when a malicious or suspicious process and/or the malicious data object persists after the termination of the process that created or executed the malicious or suspicious process and/or malicious data object.

Furthermore, although the activity log includes a listing of the executions and creations of the processes and data objects on the user computer 120, some process executions may be missing from the activity log or may not have been logged in the activity log. This may be the result of activity not sensed by the sensors 136, malfunctions of the sensors 136, glitches in the writing (i.e., storing) of the activity sensed by the sensors 136 in the activity log, or may be the result of a malicious process that deletes execution entries from the activity log. It is noted the initial execution of the attack can still be identified by using the process 400 even in situations where some process executions are not present in the activity log.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for analyzing a malware attack resultant from execution of a malware on a computerized endpoint, comprising:
   obtaining an indicator of the malware attack on the computerized endpoint by analyzing a first process running on the computerized endpoint, the first process being associated with an initial execution of the malware on the computerized endpoint by a sequence of processes that includes the first process, each respective process in the sequence of processes running on the computerized endpoint and being executed or created by at least one of the initial execution of the malware or a process in the sequence of processes; and
   identifying the initial execution of the malware on the computerized endpoint by tracking back in time from the first process, run on the computerized endpoint, back to the initial execution of the malware through a combination of executions and creations of the processes in the sequence of processes being run on the computerized endpoint, wherein the initial execution of the malware is the first malicious process execution on the computerized endpoint that is part of the malware attack and wherein the initial execution of the malware occurs after, and is separate from, an intrusion point of the malware on the computerized endpoint, and wherein the computerized endpoint is configured to connect to a network, and wherein the tracking back in time from the first process back to the initial execution of the malware includes initiating the first process as an instant process and performing the following steps:
   1) checking, based solely on the execution of the instant process on the computerized endpoint, whether the instant process is an operating system process having operating system processes as all ancestor processes, a compression process having operating system processes as all ancestor processes, or a network process having operating system processes as all ancestor processes,
   2) if the instant process is an operating system process having operating system processes as all ancestor processes, a compression process having operating system processes as all ancestor processes, or a network process having operating system processes as all ancestor processes, setting the initial execution of the malware as the instant process,
   3) if the instant process is not an operating system process having operating system processes as all ancestor processes, a compression process having operating system processes as all ancestor processes, or a network process having operating system processes as all ancestor processes, determining a process type of the instant process based solely on the execution of the instant process on the computerized endpoint and,
   4) identifying a creating process of the instant process if the determined process type of the instant process is a malicious process, an unknown process, or a process from a payload application, and identifying an executing process of the instant process if the determined process type of the instant process is not a malicious process, an unknown process, or a process from a payload application, and
   5) setting the creating process or the executing process identified in step 4) as the instant process, and returning to step 1).

2. The method of claim 1, wherein the analyzing of the first process is indicative of an activity selected from the group consisting of: accessing of a malicious web site, initiating a malicious communication with a network device, opening a malicious file, and creating a malicious data object.

3. The method of claim 1, wherein the identifying the creating process of the instant process comprises:
if the determined process type of the instant process is a process from a payload application, determining at least one file opened by the payload application.

4. The method of claim 3, wherein the at least one file is a malicious file.

5. The method of claim 1, wherein the identifying the creating process of the instant process comprises:
if the determined process type of the instant process is a malicious process or an unknown process, determining a file that caused the execution of the instant process.

6. The method of claim 1, wherein at least one process in the sequence of processes is configured to persist after termination of a creating or executing process of the at least one process.

7. A computer system for analyzing a malware attack resultant from execution of a malware on a computerized endpoint, comprising:
a non-transitory computer readable storage medium for storing computer components; and
a hardware processor for executing the computer components comprising:
a computer module configured for:
obtaining an indicator of the malware attack on the computerized endpoint by analyzing a first process running on the computerized endpoint, the first process being associated with an initial execution of the malware by a sequence of processes that includes the first process, each respective process in the sequence of processes running on the computerized endpoint and being executed or created by at least one of the initial execution of the malware or a process in the sequence of processes, and
identifying the initial execution of the malware on the computerized endpoint by tracking back in time from the first process, run on the computerized endpoint, back to the initial execution of the malware through a combination of executions and creations of the processes in the sequence of processes being run on the computerized endpoint, wherein the initial execution of the malware is the first malicious process execution on the computerized endpoint that is part of the malware attack and wherein the initial execution of the malware occurs after, and is separate from, an intrusion point of the malware on the computerized endpoint, and wherein the computerized endpoint is configured to connect to a network, and wherein the tracking back in time from the first process back to the initial execution of the malware includes initiating the first process as an instant process and performing the following steps:
1) checking, based solely on the execution of the instant process on the computerized endpoint, whether the instant process is an operating system process having operating system processes as all ancestor processes, a compression process having operating system processes as all ancestor processes, or a network process having operating system processes as all ancestor processes,
2) if the instant process is an operating system process having operating system processes as all ancestor processes, a compression process having operating system processes as all ancestor processes, or a network process having operating system processes as all ancestor processes, setting the initial execution of the malware as the instant process,
3) if the instant process is not an operating system process having operating system processes as all ancestor processes, a compression process having operating system processes as all ancestor processes, or a network process having operating system processes as all ancestor processes, determining a process type of the instant process based solely on the execution of the instant process on the computerized endpoint and,
4) identifying a creating process of the instant process if the determined process type of the instant process is a malicious process, an unknown process, or a process from a payload application, and identifying an executing process of the instant process if the determined process type of the instant process is not a malicious process, an unknown process, or a process from a payload application, and,
5) setting the creating process or the executing process identified in step 4) as the instant process, and returning to step 1).

8. The computer system of claim 7, wherein at least one process in the sequence of processes is configured to persist after termination of a process that created or executed the at least one process.

9. The computer system of claim 7, further comprising a database for storing activity of the computerized endpoint.

10. A computer usable non-transitory storage medium having a computer program embodied thereon for causing a suitable programmed system to analyze a malware attack resultant from execution of a malware on a computerized endpoint that is configured to connect to a network, by performing the following steps when such program is executed on the system, the steps comprising:
obtaining an indicator of the malware attack on the computerized endpoint by analyzing a first process running on the computerized endpoint, the first process being associated with an initial execution of the malware on the computerized endpoint by a sequence of processes that includes the first process, each respective process in the sequence of processes running on the computerized endpoint and being executed or created by at least one of the initial execution of the malware or a process in the sequence of processes; and
identifying the initial execution of the malware on the computerized endpoint by tracking back in time from the first process, run on the computerized endpoint, back to the initial execution of the malware through a combination of executions and creations of the processes in the sequence of processes being run on the computerized endpoint, wherein the initial execution of the malware is the first malicious process execution on the computerized endpoint that is part of the malware attack and wherein the initial execution of the malware occurs after, and is separate from, an intrusion point of the malware on the computerized endpoint, and wherein the tracking back in time from the first process back to the initial execution of the malware includes initiating the first process as an instant process and performing the following steps:
1) checking, based solely on the execution of the instant process on the computerized endpoint, whether the instant process is an operating system process having operating system processes as all ancestor processes, a compression process having operating system processes as all ancestor processes, or a network process having operating system processes as all ancestor processes,
2) if the instant process is an operating system process having operating system processes as all ancestor processes, a compression process having operating system processes as all ancestor processes, or a network process having operating system processes as all ancestor processes, setting the initial execution of the malware as the instant process,
3) if the instant process is not an operating system process having operating system processes as all ancestor processes, a compression process having operating system processes as all ancestor processes, or a network process having operating system processes as all ancestor processes, determining a process type of the instant process based solely on the execution of the instant process on the computerized endpoint and,
4) identifying a creating process of the instant process if the determined process type of the instant process is a malicious process, an unknown process, or a process from a payload application, and identifying an executing process of the instant process if the determined process type of the instant process is not a malicious process, an unknown process, or a process from a payload application, and
5) setting the creating process or the executing process identified in step 4) as the instant process, and returning to step 1).

* * * * *